Figure 1:
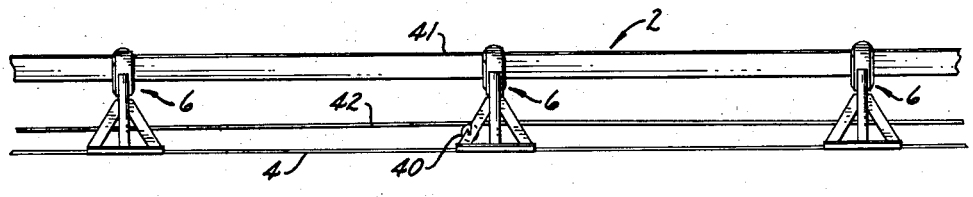

Aug. 6, 1963  R. F. LO PRESTI  3,100,042
ROPE SUPPORTED RESILIENT SIDEFRAME CONVEYOR
Filed May 5, 1960  2 Sheets-Sheet 1

INVENTOR.
Roy F. Lo Presti,
BY Parker & Carter
Attorneys.

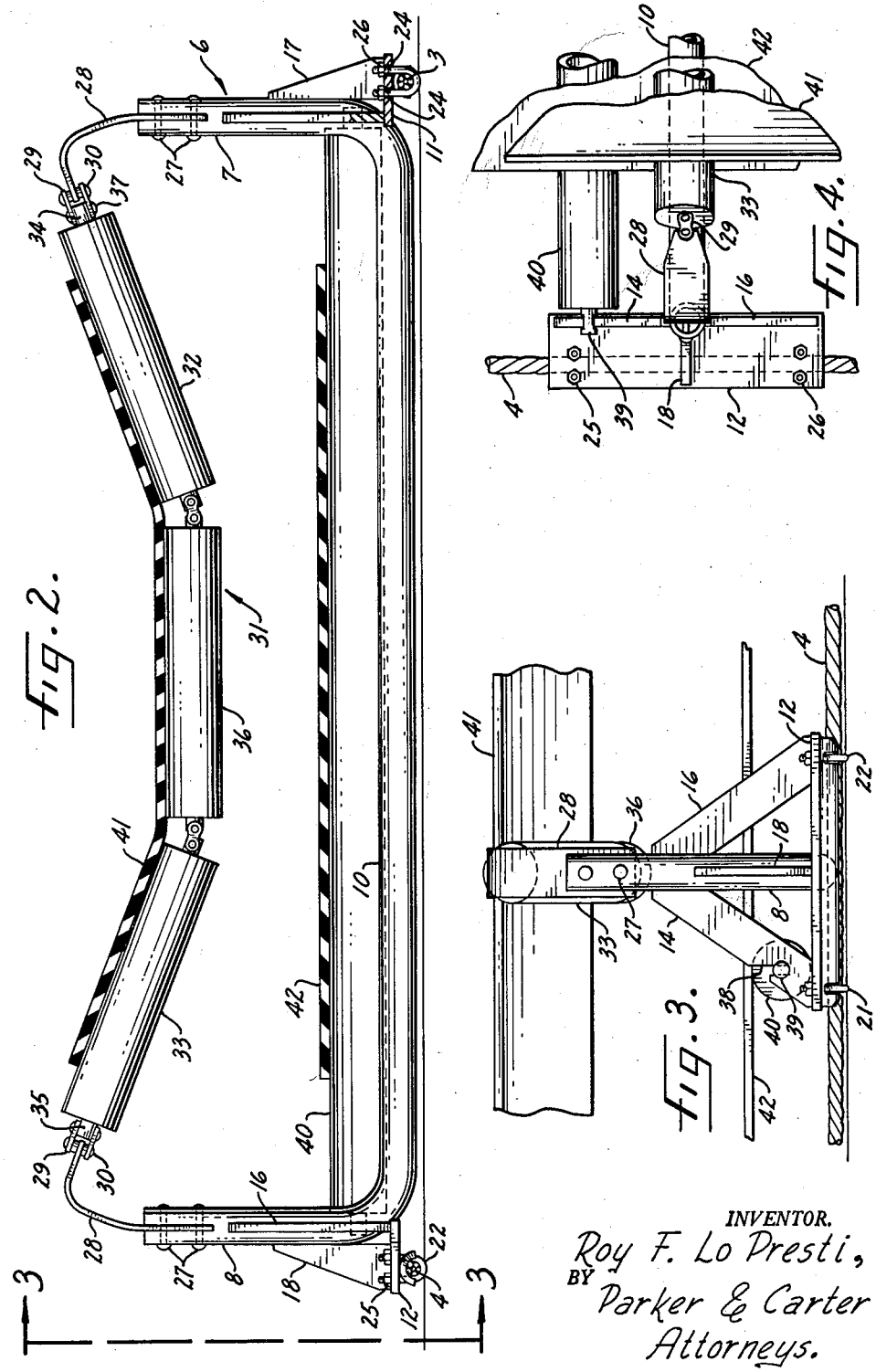

United States Patent Office 3,100,042
Patented Aug. 6, 1963

3,100,042
ROPE SUPPORTED RESILIENT SIDEFRAME CONVEYOR
Roy F. Lo Presti, Chicago, Ill., assignor to Goodman Manufacturing Company, Chicago, Ill., a corporation of Illinois
Filed May 5, 1960, Ser. No. 27,117
1 Claim. (Cl. 198—192)

This invention relates to rope sideframe conveyors and more particularly to a conveyor which embodies the advantages of both the flexible rope sideframe and rigid sideframe types of conveyors.

Such conveyors have come into wide use in industry for the conveying of bulk solid materials, such as coal, mineral ores or the like. In one conventional construction a series of flexible idler assemblies are suspended between a pair of taut wire ropes extending along and mounted atop longitudinally spaced support standerds. The taut wire ropes provide support means for flexible idler assemblies and consequently the conveying reach of the conveyor belt and permit troughing of these flexible idler assemblies. The assemblies automatically trough as a function of the weight carried by the conveyor belt. An increased load capacity, decreased belt wear and many other desirable results are obtained.

Along with the advantages of the rope sideframe conveyor as hereinbefore described, however, some operational problems are also found. The mining industries are prime users of these conveyors and in mining operations the conveyors are used to advantage as all-purpose carriers. A fast and convenient subway system for miners proceeding to and from work and between work locations is provided by the conveyor belt. The wire ropes extending along the edge of the conveyor belt occasionally present a safety problem to these men in gaining access to and departing the moving belt. Since the longitudinally extending wire ropes are separated from the edge of the belt, a pocket or gap remains between the ropes and the belt and any misstep might result in being thrown against these ropes. In addition, in operation of the conveyor in coal mines, for example, lumps of coal often fall over the side of the belt. If a lump is too large to fall freely between the edge of the belt and a corresponding wire rope, it will be carried along between the belt edge and the rope in a bouncing manner creating friction and belt wear. Upon eventually reaching and striking one end of an idler assembly, the erratically moving lump often throws the idler assembly and support standards out of line.

Accordingly, a primary object of this invention is to provide a new and improved rope sideframe conveyor which eliminates the elevated wire ropes but retains the advantages of the resiliently mounted troughing idler assembly.

Another object is to provide a rope sideframe conveyor wherein the longitudinally extending wire ropes are mounted at ground level.

Still another object is to provide a rope sideframe conveyor having rigid unitary support standards carried at their bases by wire ropes.

Yet another object is to provide a rope sideframe conveyor of the aforedescribed character wherein troughing idler assemblies are suspended between the upright legs of these standards.

Still another object is to provide a rope sideframe conveyor of the aforedescribed character wherein troughing idler assemblies are resiliently suspended between the upright legs of these standards.

Still another object of this invention is to provide a rope sideframe conveyor wherein troughing idler assemblies are resiliently supported between the upstanding legs of rigid support standards by leaf spring connections.

These and other objects of this invention will appear in the following specification and claim wherein like reference numerals identify like parts throughout.

Figure 5:
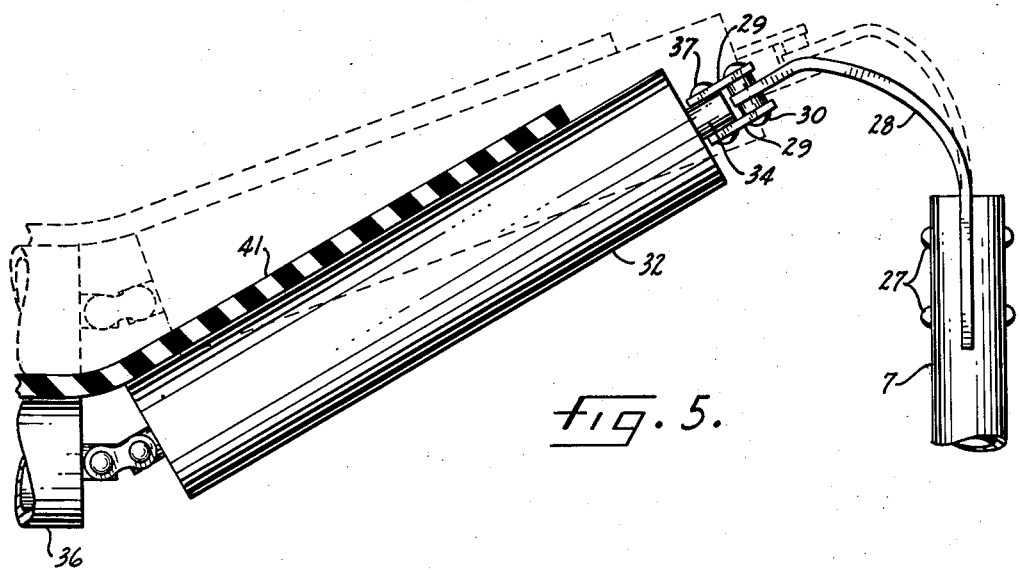

The invention is illustrated more or less diagrammatically in the drawings wherein:

FIGURE 1 is a side elevation of a portion of a conveyor system embodying this invention, FIGURE 2 is a front elevation in detail of an idler assembly and its associated support standard, FIGURE 3 is a view along line 3—3 of FIGURE 2, FIGURE 4 is a plan view in detail of a portion of the conveyor shown in FIGURE 2, and FIGURE 5 is a detailed view of one end of the idler assembly and its resilient support means.

Shown generally at 2 in FIGURE 1 is a portion of a rope sideframe conveyor embodying this invention. The conveyor includes a pair of longitudinally extending wire ropes 3, 4 disposed generally at ground level. In FIGURE 2 is shown a support standard comprising a rigid upright U-shaped framework 6 connecting the wire ropes 3, 4 and disposed therebetween. A series of these frameworks 6 are disposed at generally regularly spaced intervals longitudinally of the wire ropes.

Each framework 6 includes upstanding legs 7, 8 and a horizontal bight portion 10 connecting the upstanding legs to form a U-shaped tube. Horizontally oriented longitudinally extending base plates 11, 12 are secured by welding at the junction of each of the legs 7, 8 and the bight 10. A pair of wing braces 14 and 16 are welded to each upstanding leg and extend outwardly therefrom to a welded connection with the base plates. Transversely oriented reinforcing braces 17, 18 are secured, as by welding to the legs and base plates. Each of the series of support standards is constructed in identical manner. Fixedly securing the bases 11, 12 to the longitudinally extending wire ropes 3, 4 are U-clamps 21, 22. These clamps extend through holes 24 in the bases, as best seen in FIGURE 2, and are affixed thereto by nuts 25, 26.

Secured to the upper end of each of the legs 7, 8 by bolts or rivets 27 are inverted L-shaped leaf springs 28. Links 29 are pivotally connected to the free ends of springs 28 by pins 30. The inner ends of the links are connected to the outer ends of a troughing idler assembly 31. In this instance an assembly of conventional construction including a pair of wing rollers 32, 33 rotating on dead shafts 34, 35 and a center roller 36 is illustrated. The outer end of each wing roller dead shaft is pivotally connected to a corresponding link 29 through pin 37.

Slots 38 are provided in corresponding braces 14 of selected support standards along the conveyor. Dead shafts 39 supporting return rollers 40 for rotation thereabout are received in the slots. The selection of the number and location of standards to support return rollers is dictated by the topography of the terrain.

A conveyor belt comprising a carrying reach 41 and a return reach 42 is supported by the troughing idler assembly and the return roller.

The use, operation and function of this invention are as follows:

Each support standard is secured between the longitudinally extending wire ropes 3, 4 in a manner hereinbefore described. The taut wire ropes are normally disposed at the level of the terrain but may depart therefrom in crossing depressions or passing over rises. Consequently some support standards may be prevented from resting on the terrain.

In having the wire ropes at the base of the support standards regardless of the relationship of the associated terrain, several distinctive advantages are obtained. Since the ropes lie below the center of gravity of the conveyor support standards, the conveyor can be moved in toto by pulling the ends of the wire rope. In passages where a conveyor assembly crosses the openings of joining passage ways, vehicles can be permitted easy traverse over the conveyor by merely separating the upper reach of the belt and removing a support standard. Planks can then easily be placed over the lower reach of the belt and the wire ropes to prevent damage thereto. Men riding the conveyor belt can gain access to it and depart from it without danger of injury from being thrown against a rope adjacent the edge of the conveyor belt. In conjunction with this, lumps of coal which fall from the edge of the belt are not carried along between the belt and a wire rope with untoward results.

The resilient leaf springs supporting the idler assemblies permit load responsive troughing in a manner similar to that obtained with rope connected idler assemblies. As shown in FIGURE 5, the leaf springs 28 move between the dotted line position and the solid line position in going from no-load to loaded condition.

This invention then provides the advantages of a resiliently mounted troughing idler assembly construction with the safety features and enumerated assets of the rigid sideframe conveyor. The conveyor is easily assembled and dismantled by a small working crew. It is economical to manufacture and simple to maintain. The leaf springs permit load responsive belt troughing yet are inherently simple in construction.

Although one embodiment of the invention has been described in detail, it will be obvious to those skilled in the art that modifications may be utilized. The base plates 11, 12 can be longer or shorter, but it is always desirable to space the tightening means 21, 22 a substantial distance apart in order to provide stability to the entire assembly. Likewise, it may be advantageous under certain conditions to secure the ropes to skids so that the entire conveyor may more easily be pulled in toto from one location to another.

The foregoing description is illustrative only and not definitive and it is intended that the scope of the invention be limited only by the appended claim.

I claim:

A flexible belt conveyor which is easily movable, without disassembly, from place to place and in which, upon slackening or breaking of the belt only, the height may be lowered to ground level to enable passage of ground supported apparatus thereacross, said conveyor including, in combination, two skid wires, an intermediate working length of said skid wires being at the level of and in contact with the ground throughout said intermediate working length, said skid wires being generally parallel to one another throughout said intermediate working length and being tensioned at all times, a spreader member disposed substantially transversely with respect to the axes of the skid wires, a pair of upstanding roller assembly supporting members, one from each end of the spreader member, a wire clamping assembly for each skid wire, each wire clamping assembly having a wire engaging portion elongated in the direction of the skid wires for stability, each wire clamping assembly connecting an associated skid wire to an associated end of the spreader member, said wire clamping assemblies being secured to and carried by the spreader member and brackets and maintaining the skid wires in skidding contact with the ground, a roller assembly having its ends mounted from the upper portions of the upstanding roller assembly supporting members and capable of flexing in a direction to vary the spacing between the ends of the roller assembly whereby the downward deflection of the roller assembly absorbs impact without affecting the skid wires.

References Cited in the file of this patent

UNITED STATES PATENTS

| | | |
|---|---|---|
| 1,773,621 | Hopkinson | Aug. 19, 1930 |
| 2,277,402 | Hoeck | Mar. 24, 1942 |
| 2,837,202 | Baechli | June 3, 1958 |
| 2,868,355 | McCann | Jan. 13, 1959 |
| 2,921,668 | Risse | Jan. 19, 1960 |
| 2,983,364 | Lo Presti | May 9, 1961 |
| 2,983,365 | Lo Presti | May 9, 1961 |
| 3,019,890 | Knill et al. | Feb. 6, 1962 |